(12) United States Patent
Schmalz

(10) Patent No.: US 6,650,515 B2
(45) Date of Patent: Nov. 18, 2003

(54) CIRCUIT BREAKER INCLUDING POWER SUPPLY MONITOR CIRCUIT TO DISABLE A TRIP MECHANISM

(75) Inventor: Steven Christopher Schmalz, Greenfield, WI (US)

(73) Assignee: Eaton Corporation, Cleveland, OH (US)

( * ) Notice: Subject to any disclaimer, the term of this patent is extended or adjusted under 35 U.S.C. 154(b) by 257 days.

(21) Appl. No.: 09/940,232

(22) Filed: Aug. 27, 2001

(65) Prior Publication Data

US 2003/0038692 A1 Feb. 27, 2003

(51) Int. Cl.[7] ................................................. H02H 3/00
(52) U.S. Cl. ........................................... 361/42; 361/79
(58) Field of Search .............................. 361/42, 45, 79, 361/44, 18, 100, 101; 324/528, 530

(56) References Cited

U.S. PATENT DOCUMENTS

| | | | |
|---|---|---|---|
| 5,224,006 A | 6/1993 | MacKenzie et al. | 361/79 |
| 5,691,869 A | 11/1997 | Engel et al. | 361/94 |
| 5,748,008 A * | 5/1998 | Landreth | 324/763 |
| 5,818,237 A | 10/1998 | Zuercher et al. | 324/536 |

* cited by examiner

Primary Examiner—Lawrence Luk
(74) Attorney, Agent, or Firm—Marvin L. Union

(57) ABSTRACT

A circuit breaker includes separable contacts, an operating mechanism, a power supply, and a trip mechanism powered from a first power supply output. A power supply monitor circuit includes a terminal adapted for electrical connection to a ground, a first resistor electrically connected in series with a power supply regulator, a first transistor having an output and two inputs electrically connected in parallel with the first resistor, a first capacitor electrically connected between the first power supply output and the first transistor output, a second resistor electrically connected in series with the first capacitor between power supply outputs, a second transistor having a first input electrically interconnected with the first transistor output, a second input and an output, a diode electrically connected between the terminal and the second transistor second input, and an interface between the second transistor output and a trip mechanism input for disabling the tripping.

21 Claims, 13 Drawing Sheets

CIRCUIT BREAKER INCLUDING POWER SUPPLY MONITOR CIRCUIT TO DISABLE A TRIP MECHANISM

CROSS-REFERENCE TO RELATED APPLICATION

This application is related to commonly assigned U.S. patent application Ser. No. 09/845,519, filed Apr. 30, 2001, entitled "Circuit Breaker" (Attorney Docket No. 00-mAE2-326).

BACKGROUND OF THE INVENTION

1. Field of the Invention

This invention relates to electrical switching apparatus and, more particularly, to circuit breakers, such as, for example, arc fault circuit breakers.

2. Background Information

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

Subminiature circuit breakers are used, for example, in aircraft electrical systems where they not only provide overcurrent protection but also serve as switches for turning equipment on and off. A circuit breaker push-pull handle is moved from in-to-out in order to open the load circuit. This action may be either manual or, else, automatic in the event of an overload or fault condition. If the push-pull handle is moved from out-to-in, then the load circuit is re-energized. If the load circuit had been automatically de-energized, then the out-to-in operation of the push-pull handle corresponds to a circuit breaker reset action.

Typically, subminiature circuit breakers have only provided protection against persistent overcurrents implemented by a latch triggered by a bimetal responsive to $I^2R$ heating resulting from the overcurrent. There is a growing interest in providing additional protection, and most importantly arc fault protection. Arc faults are typically high impedance faults and can be intermittent. Nevertheless, such arc faults can result in a fire. During sporadic arcing fault conditions, the overload capability of the circuit breaker will not function since the root-mean-squared (RMS) value of the fault current is too small to activate the automatic trip circuit. An electronic arc fault sensing circuit directly trips and, thus, opens the circuit breaker.

Although many circuit breakers also employ ground fault protection, in aircraft applications, the aircraft frame is ground, and there is no neutral conductor. Some aircraft systems have also provided ground fault protection, but through the use of additional devices, namely current transformers which in some cases are remotely located from the protective relay.

Electronic circuitry may malfunction if its alternating current (AC) power source is operating below the minimum voltage and/or frequency levels necessary to maintain the stability of such circuitry's direct current (DC) regulated power supply or supplies.

For example, an aerospace arc fault circuit breaker may employ an analog electronic circuit to implement an envelope arc detection algorithm. See U.S. Pat. No. 5,818,237. The analog electronic circuit utilizes a dual voltage (positive and negative 13.6 VDC) power supply, which is derived from a 120 VAC, 400 Hz aircraft power line by a capacitively coupled voltage dropping network. As is common in this type of power supply, the two 13.6 VDC power supplies lose regulation if the 120 VAC source voltage and/or 400 Hz frequency fall low enough such that the current flowing through the voltage dropping network is less than what is consumed by the circuit itself. Once regulation is lost, the envelope arc fault detection circuit may malfunction and generate a false output indication, thereby causing the circuit breaker to trip open. This unwanted tripping of the circuit breaker is unacceptable since it could interrupt the operation of a flight critical system being sourced by the circuit breaker and, thus, compromise safe operation of the aircraft.

There is room for improvement in circuit breakers.

SUMMARY OF THE INVENTION

The present invention is directed to a circuit breaker, which employs a power supply monitor circuit for a power supply having a first regulated direct current voltage with a first polarity and a second direct current voltage with a second polarity, which is opposite the first polarity. The monitor circuit has an output, which disables a circuit breaker trip mechanism, which is powered from the first direct current voltage.

In accordance with the invention, a circuit breaker comprises: separable contacts; an operating mechanism for opening and closing the separable contacts; a power supply comprising an input adapted to receive an alternating current voltage, a regulator adapted to regulate a first direct current voltage having a first polarity, a first output adapted to provide the first direct current voltage, and a second output adapted to provide a second direct current voltage having a second polarity which is opposite the first polarity; a trip mechanism cooperating with the operating mechanism, powered from the first output of the power supply, and responsive to electrical conditions of the separable contacts for tripping the separable contacts open, the trip mechanism having an input for disabling the tripping; and a power supply monitor circuit comprising: a node adapted for electrical connection to a ground, a first resistor electrically connected in series with the regulator of the power supply, a first transistor having two inputs electrically connected in parallel with the first resistor and having an output, a first capacitor electrically connected between the first output of the power supply and the output of the first transistor, a second resistor electrically connected in series with the first capacitor between the first and second outputs of the power supply, a second transistor having a first input electrically interconnected with the output of the first transistor, a second input and an output, a diode electrically connected between the node and the second input of the second transistor, and an interface between the output of the second transistor and the input of the trip mechanism.

Preferably, the interface includes a transistor having a collector, which is open when the first output of the power supply is in regulation; and the trip mechanism includes an arc fault detector powered from the first output of the power supply, the arc fault detector has a capacitor, which is electrically connected to the collector, and which is discharged by the collector when the power supply is out of regulation in order to disable the arc fault detector.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to a subminiature circuit breaker for use in aircraft alternating current (AC) systems, which are typically 400 Hz, but can also be used in direct current (DC) systems. It will also become evident that the invention is applicable to other types of circuit breakers including those used in AC systems operating at other frequencies; to larger circuit breakers, such as miniature residential or commercial circuit breakers; and to a wide range of circuit breaker applications, such as, for example, residential, commercial, industrial, aerospace, and automotive. As further non-limiting examples, both AC (e.g., 120, 220, 480–600 VAC) operation at a wide range of frequencies (e.g., 50, 60, 120, 400 Hz) and DC operation (e.g., 42 VDC) are possible.

Figure 1:
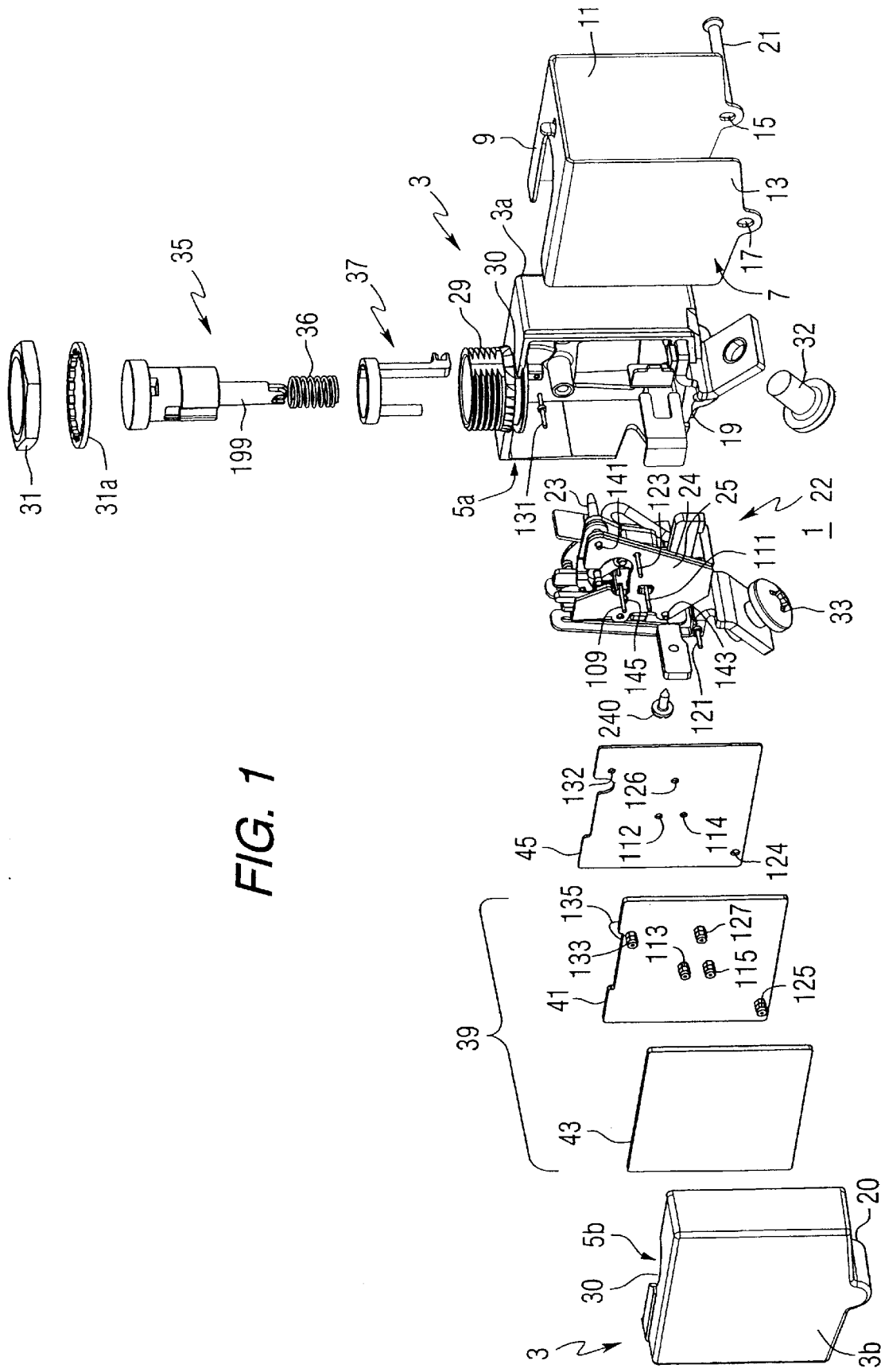
FIG. 1 is an exploded isometric view of a circuit breaker in accordance with the present invention.
Figure 2:
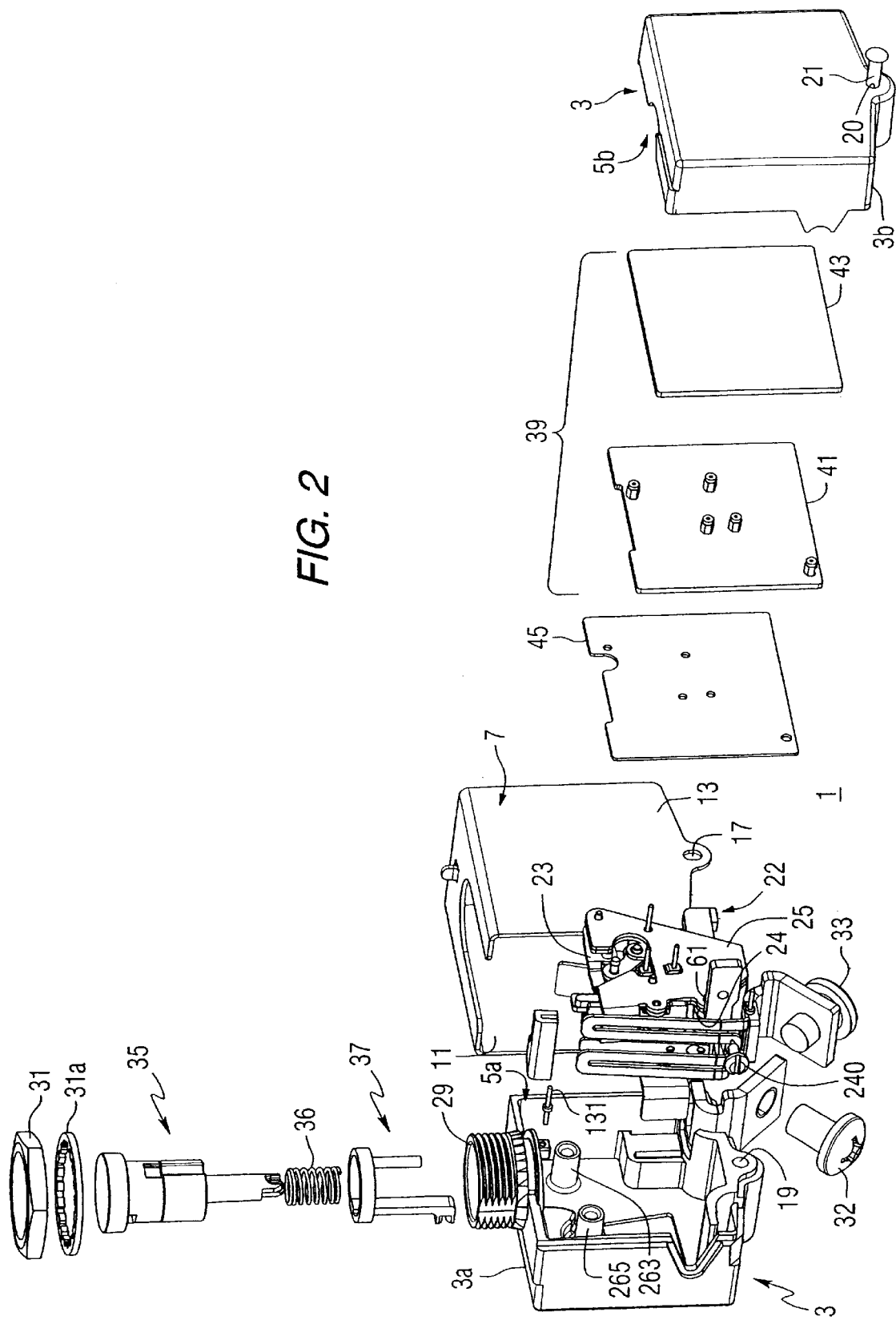
FIG. 2 is another exploded isometric view from the opposite end of FIG. 1.

Referring to FIGS. 1 and 2, an exemplary circuit breaker 1 has a housing 3 formed by first and second sections 3a and 3b molded of an insulative resin which sections are joined along a mating plane to form an enclosure from confronting cavities 5a and 5b, respectively. The circuit breaker 1 also includes an external clip plate 7 having a top 9 and two sides 11,13 disposed therefrom. The clip plate side 11 captures the section or molded case 3a and the other clip plate side 13 captures the other section or molded cover 3b. Each of the sides 11,13 includes an opening 15,17, respectively, proximate the bottom of the corresponding side. The molded case 3a and the molded cover 3b each have a respective opening 19 and 20 therethrough. A fastener 21, such as a rivet, is disposed through the opening 15 of the side 11, through the openings 19,20 of the molded case 3a and the molded cover 3b, and through the opening 17 of the side 13, in order to draw the one side 11 toward the other side 13 and, thereby, secure the molded case 3a to the molded cover 3b.

Figure 6:
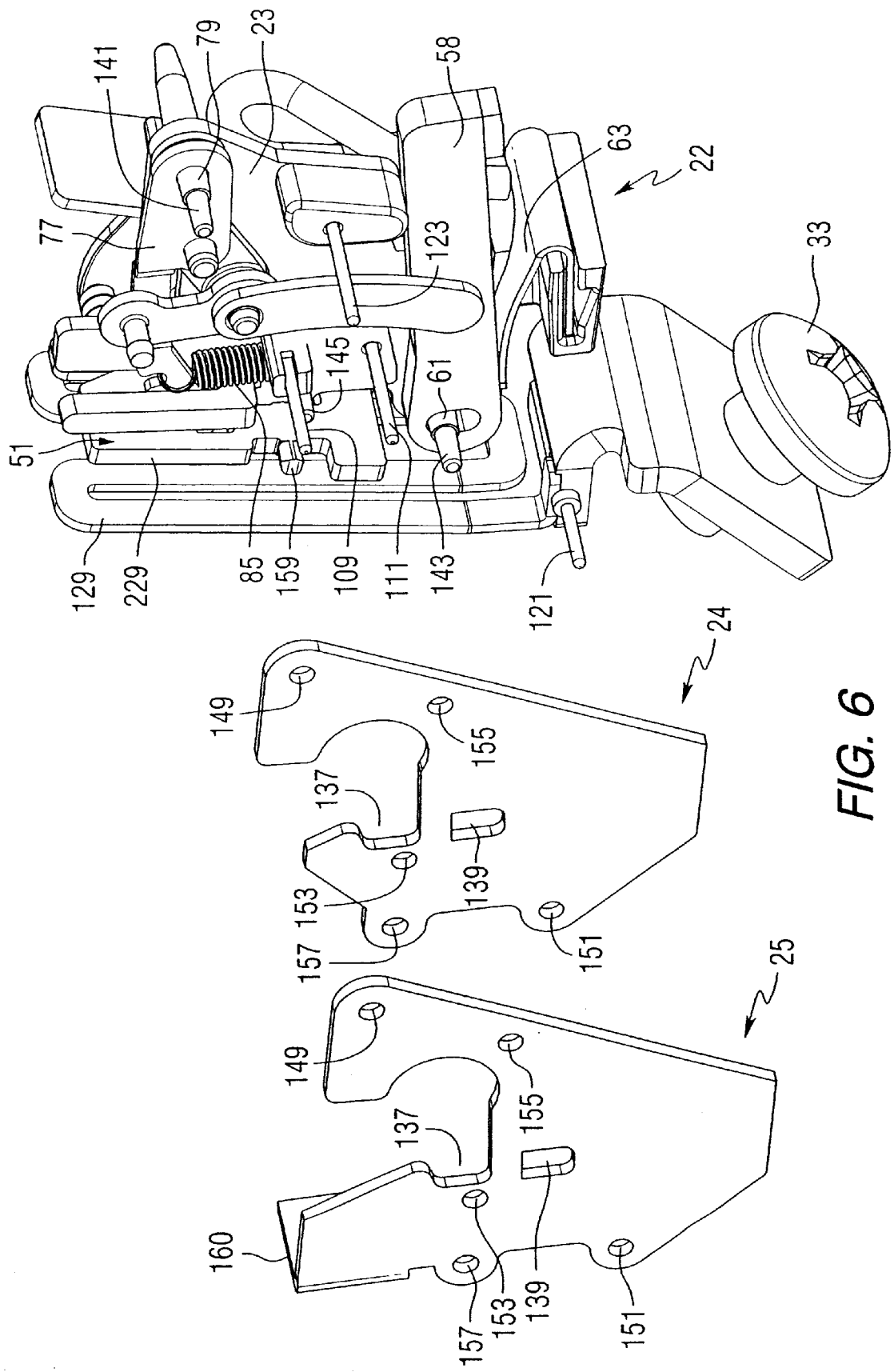
FIG. 6 is an exploded isometric view of the operating mechanism and two top plates of the circuit breaker of FIG. 1.
Figure 7:
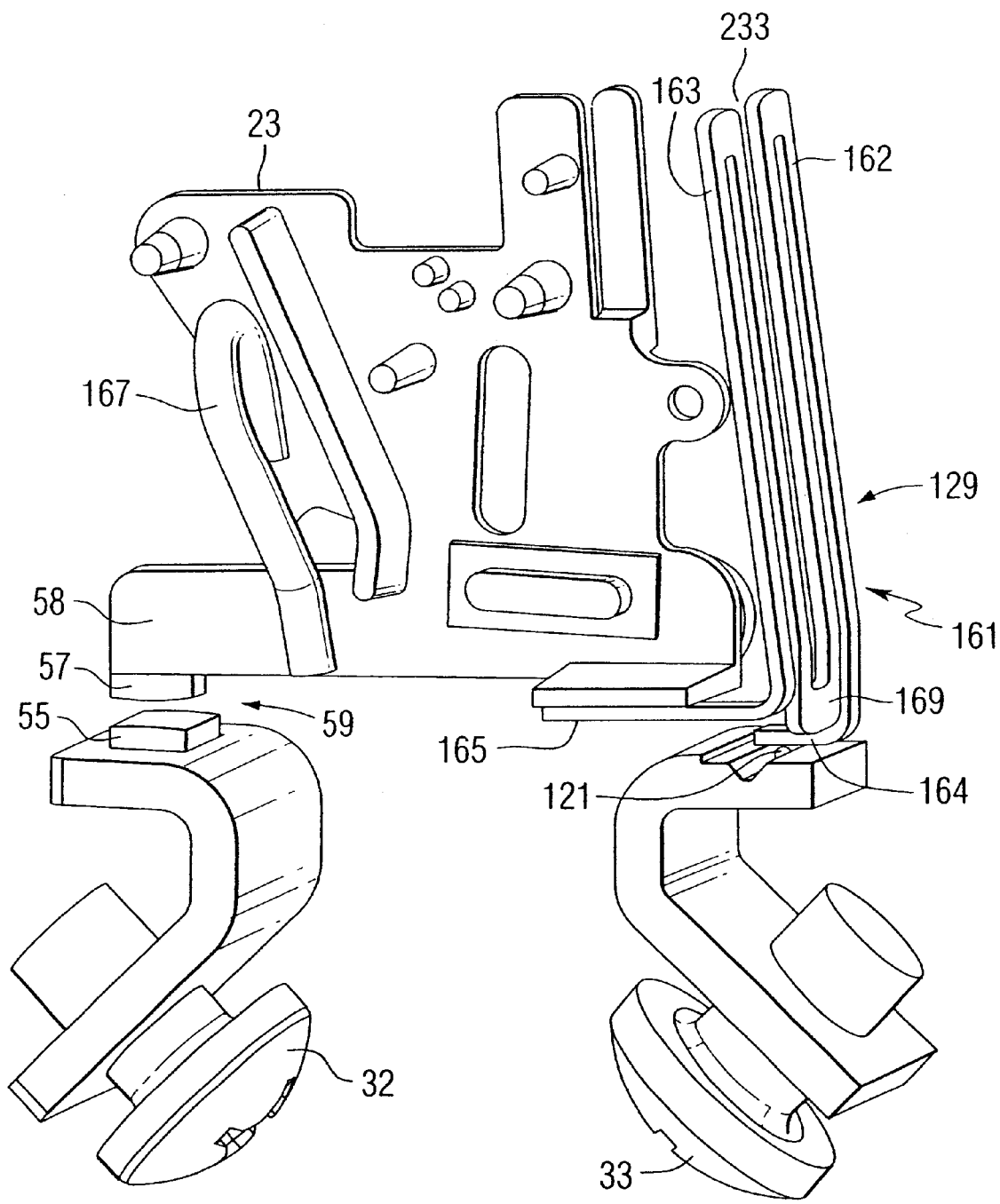
FIG. 7 shows an isometric view of the load terminal, bimetal, mechanism plate, movable contact arm and line terminal of the circuit breaker of FIG. 1.

The circuit breaker 1 further includes an operating mechanism 22 mounted on a support mechanism such as the exemplary mechanism jig plate 23 (as best shown in FIGS. 6 and 7), a first mechanism top plate 24, a second mechanism top plate 25 (the top plates 24,25 are best shown in FIG. 6), and a bezel 29 mounted in an opening 30 of the housing 3. The bezel 29 is held in place by the external clip plate 7 and housing 3. In turn, a suitable fastener, such as the exemplary nut 31 and washer 31a mount the circuit breaker 1 to a mounting panel (not shown). The circuit breaker 1 also includes a line terminal 32, a load terminal 33, and an operating handle assembly 35, which protrudes through the opening 30 and the bezel 29. The operating handle assembly 35 is suitably biased away from the opening 30 by a spring 36. For ON/OFF operation, the handle assembly 35 is driven up by springs 63 (FIG. 3) and 36. Spring 36 is employed on trip operations to reset the handle assembly 35 to the OFF position.

The circuit breaker 1 further includes a movable and illuminable arc fault indicator 37, an arc fault detector 39 including exemplary printed circuit boards (PCBs) 41,43, and an insulator 45. Suitable arc fault detectors are disclosed, for instance, in U.S. Pat. Nos. 5,224,006; 5,691,869; and 5,818,237, which are hereby incorporated by reference. In the exemplary embodiment, the mechanism plate 23 is electrically conductive and is preferably made of stainless steel or brass. The operating mechanism 22 is assembled to and supported by the mechanism plate 23, which is mounted in the cavity 5a of the molded section 3a, and the PCBs 41,43 are mounted in the cavity 5b of the molded section 3b.

Figure 3:
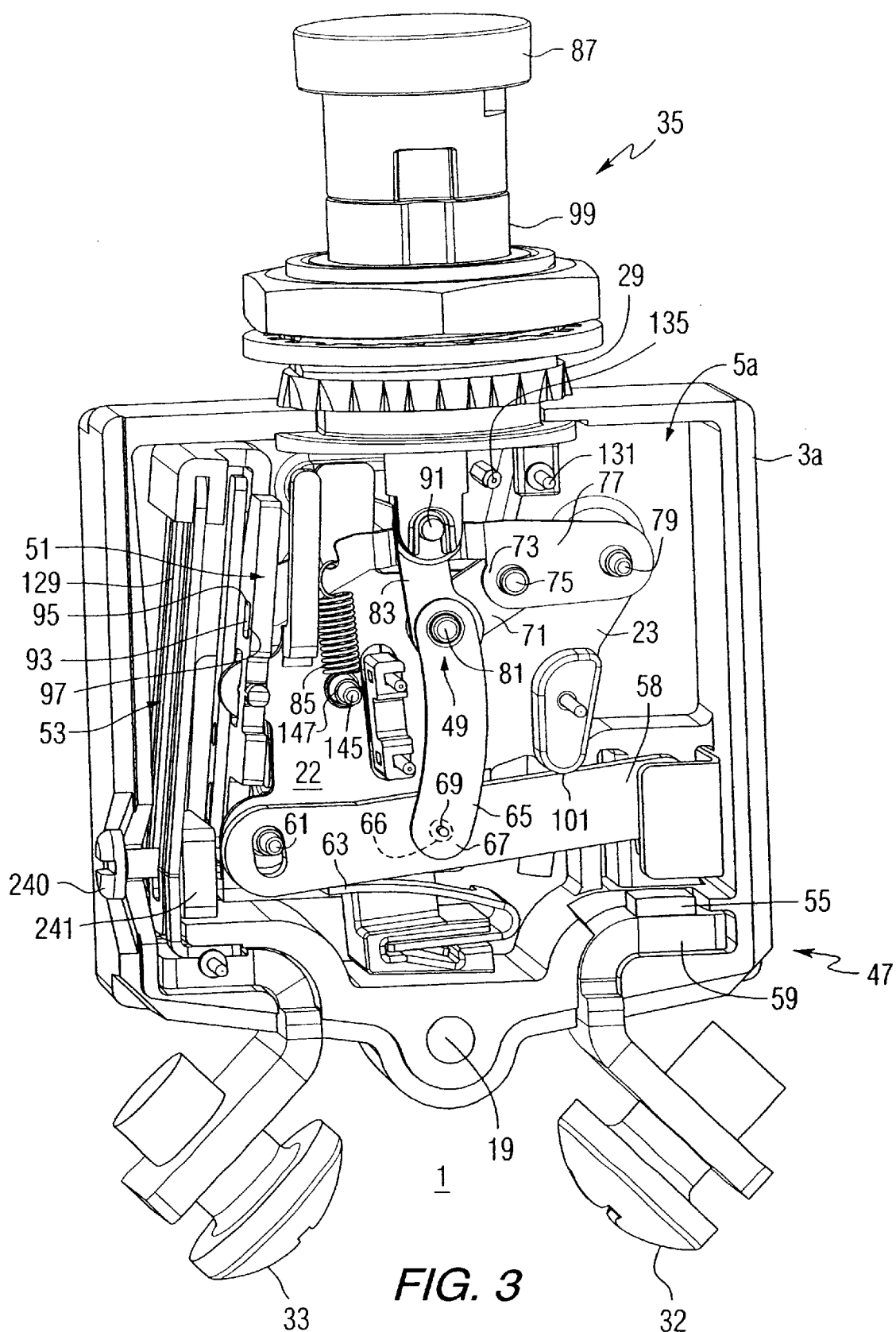
FIG. 3 is a front elevation view of the circuit breaker of FIG. 1, with one-half of the cover and two top plates removed, showing the circuit breaker in the off condition.
Figure 4:
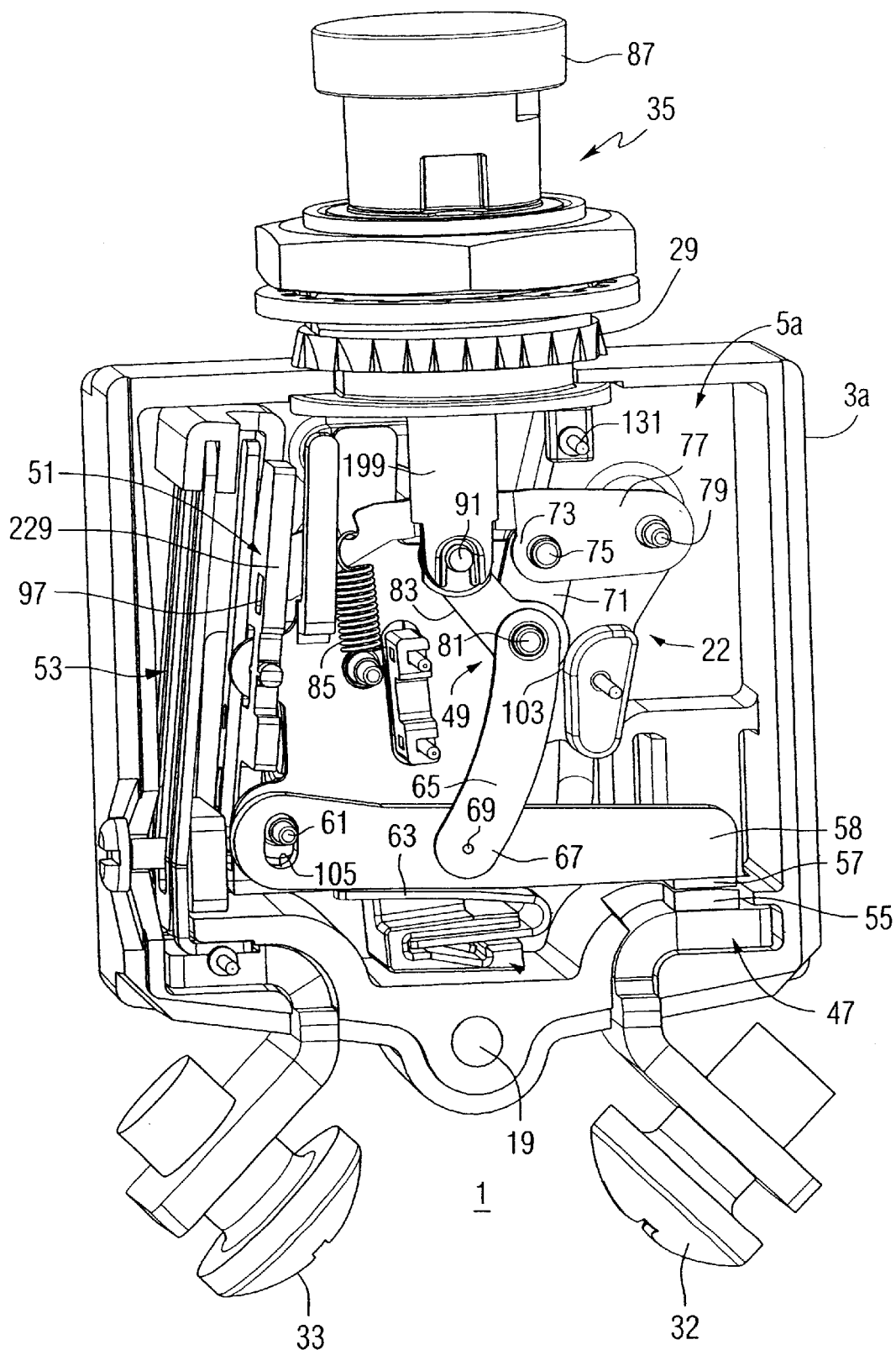
FIG. 4 is a view similar to FIG. 3 but showing the circuit breaker in the on condition.
Figure 5:
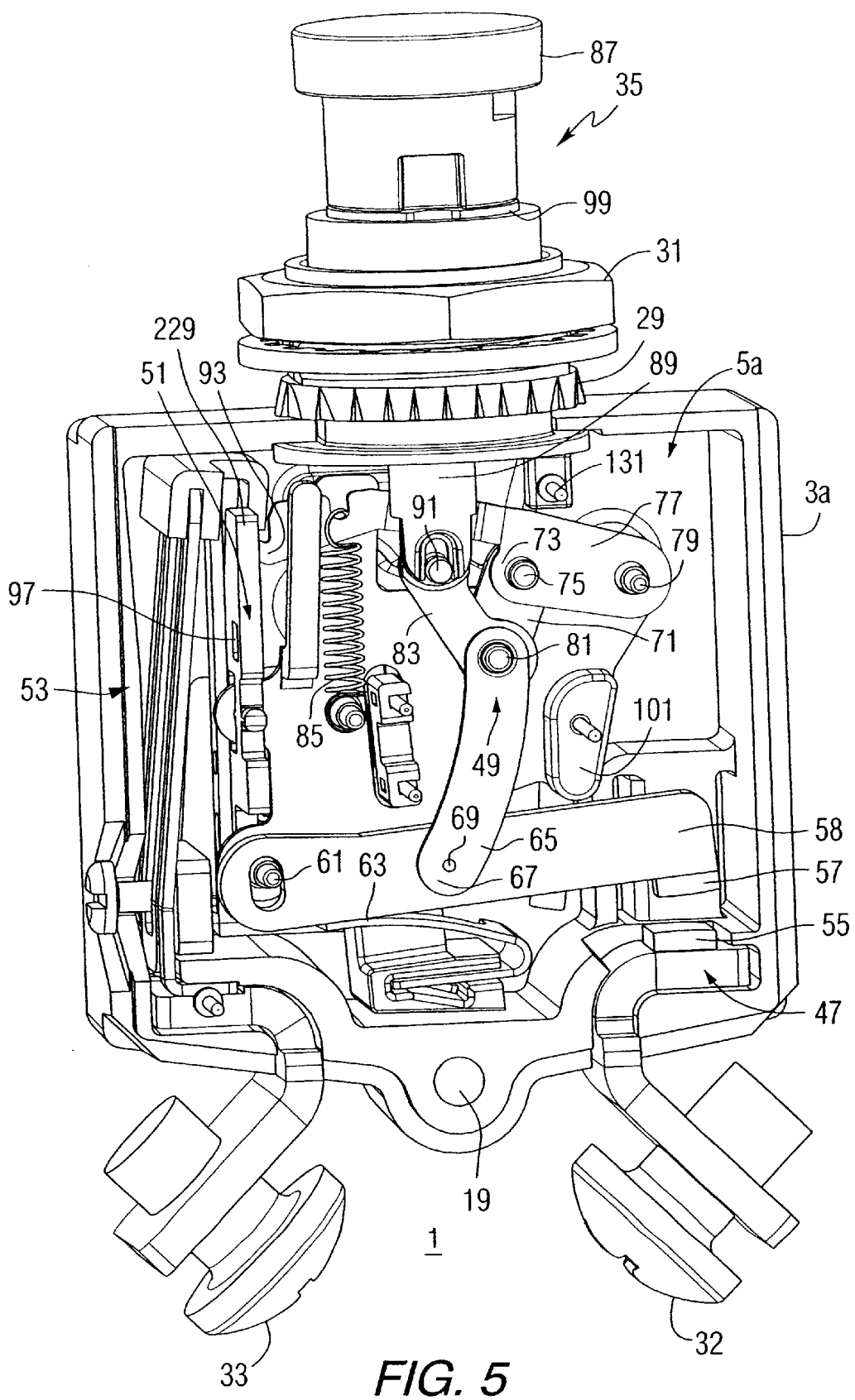
FIG. 5 is a view similar to FIG. 3 but showing the circuit breaker in the tripped condition.

Referring to FIGS. 3–5, the functional components of the circuit breaker 1 include a separable contact assembly 47 (as best shown in FIGS. 4 and 5), a toggle mechanism 49, the handle assembly 35, a latch member assembly 51, and an overcurrent assembly 53. The toggle mechanism 49, handle assembly 35, and latch assembly 51 form the latchable operating mechanism 22. The circuit breaker 1 also includes the line terminal 32 and the load terminal 33 supported in the bottom of the molded case 3a and having cantilevered sections extending outside of the case 3 for connection to respective line and load conductors (not shown).

As discussed below in connection with FIG. 8, the overcurrent assembly 53 includes the PCBs 41,43 and a trip motor 119 (for arc fault conditions), and a bimetal 129 (for persistent overcurrent conditions). The overcurrent assembly 53 also includes an instantaneous trip function, which like the trip motor 119 and bimetal 129, actuate the latch assembly 51 to trip open the separable contact assembly 47.

The separable contact assembly 47 includes a fixed contact 55 fixed to the line terminal 32 and a movable contact 57 (FIGS. 4 and 5) carried by and electrically connected to a movable contact arm 58 within the housing 3. The fixed contact 55 and movable contact 57 together form a set of separable contacts 59. The contact arm 58 is pivotally mounted on a metal pin 61, which is part of mechanism plate 23. The plates 24,25 (FIG. 6) retain the contact arm 58 on the pin 61. A cantilever leaf spring 63 forms a main spring, which biases the contact arm 58 counter-clockwise (with respect to FIGS. 3–5) to open the separable contacts 59 (as shown in FIG. 5). As discussed below in connection with FIG. 7, the load terminal 33 is electrically interconnected with the contact arm 58 and the movable contact 57, and the line terminal 32 is electrically connected to the fixed contact 55. The latchable operating mechanism 22 functions to open (FIGS. 3 and 5) and close (FIG. 4) the separable contacts 59.

The contact arm 58 is pivoted between open (FIG. 3) and closed (FIG. 4) positions of the separable contacts 59 by the toggle mechanism 49. This toggle mechanism 49 includes a lower toggle link 65 pivotally connected by a pin 66 (shown in hidden line drawing in FIG. 3) at a first or lower end 67 to the contact arm 58 at a pivot point 69. In this manner, the toggle mechanism 49 is mechanically coupled to the separable contacts 59 for opening and closing such separable contacts.

A second toggle link 71 is pivotally connected at a first or upper end 73 by a pin 75 to a latch lever 77, which in turn is pivotally mounted by a metal pin 79 that is part of mechanism plate 23. The second ends of the first toggle link 65 and the second toggle link 71 are pivotally connected by a knee pin 81. The toggle mechanism 49 further includes a drive link 83, which mechanically couples the toggle mechanism 49 to the handle assembly 35.

Whenever the latch assembly 51 is actuated, the latch lever 77 is unlatched and the main spring 63 drives the movable contact arm 58 upward in order to open the separable contacts 59. Also, through movement of the links 65,71, the latch lever 77 is rotated clockwise (with respect to FIG. 5). From this tripped position, the spring 36 (FIGS. 1 and 2) returns the handle assembly 35 to the OFF position, and the latch lever return spring 85 returns the latch lever 77, in order that it can be engaged by the latch member assembly 51. Otherwise, the latch assembly 51 latches the latch lever 77 and the toggle mechanism 49 in a latched condition (FIGS. 3 and 4) in which the toggle mechanism 49 is manually operable by the handle assembly 35 between a toggle open position (FIG. 3) and a toggle closed position (FIG. 4) to open and close the separable contacts 59.

As can be seen from FIG. 5, the handle assembly 35 includes a handle member 87 having a stem 89. The drive link 83 of the toggle mechanism 49 is pivotally connected to the stem 89 by a pin 91. The handle member 87 is supported for reciprocal linear movement by the bezel 29. The latch lever 77 has a finger 93 terminating in a hook 95 (FIG. 3), which engages (FIGS. 3 and 4) an opening 97 in the latch assembly 51.

The exemplary circuit breaker 1 operates in the following manner. In the OFF position (FIG. 3), which is the toggle open position of the toggle mechanism 49, the handle member 87 is up with an indicator portion 99 of the stem 89 visible to indicate the OFF condition. The latch lever 77 is latched by engagement of its hook 95 by the opening 97 in the latch assembly 51. The main spring 63 has rotated the movable contact arm 58 counter-clockwise (with respect to FIG. 3) against a stop portion 101 of the mechanism plate 23 so that the separable contacts 59 are open.

Depressing the handle member 87, which moves linearly downward to the position shown in FIG. 4, turns ON the circuit breaker 1. The drive link 83 pushes the knee pin 81 downward and to the right, and the first toggle link 65 downward, which results in clockwise rotation (with respect to FIGS. 3 and 4) of the movable contact arm 58 against the main spring 63. As the upper end of the second (upper) toggle link 71 is held stationary by the latch lever 77, the toggle mechanism 49 in general, and the first (lower) link 65 in particular, seats against a stop portion 103 of the mechanism plate 23 in the toggle closed position shown in FIG. 4. This latter motion occurs through clockwise rotation (with respect to FIG. 4) of the contact arm 58, which is pivotally mounted on the pin 61 at the slotted aperture 105 thereof. With the separable contacts 59 closed in this manner, the main spring 63 provides contact pressure on the separable contacts 59 and accommodates for wear.

The circuit breaker 1 may be manually opened from the ON position (FIG. 4) to the OFF position (FIG. 3) by raising the handle member 87. Initially, a downward force is applied to the contact arm 58 through the first toggle link 65. However, when the knee pin 81 passes through the center line between the pins 91 and 75, the toggle mechanism 49 breaks and the main spring 63 rotates the movable contact arm 58 counter-clockwise (with respect to FIGS. 3 and 4) until it seats against the stop 101 with the separable contacts 59 open. In turn, the handle 87 rises to the OFF position (FIG. 3).

As discussed below in connection with FIGS. 3 and 8 (persistent overcurrent conditions), FIG. 14 (arc fault conditions), and FIGS. 3–6 (instantaneous trip conditions), the circuit breaker 1 can be tripped (FIG. 5) to the open condition under various conditions. Regardless of such conditions, the latch assembly 51 releases the latch lever 77, which is driven clockwise (with respect to FIGS. 4 and 5) about the pin 79. Also, the movable contact arm 58 is driven counter-clockwise (with respect to FIGS. 4 and 5) through the main spring 63 to open the separable contacts 59.

In this transitory trip position, the handle member 87 is down, the latch lever 77 is rotated clockwise, and the movable contact arm 58 is in the open position. From this position, the handle spring 36 returns the handle member 87 to the OFF position and the latch lever spring 85 rotates the latch lever 77 counter-clockwise to a position where it can be engaged by the latch assembly 51. This is the OFF position.

The lower end of the handle spring 36 engages an inside surface (not shown) of the bezel 29. The inside of the bezel 29 forms a cup (not shown), with a relatively small hole (not shown) in the center thereof. That hole is of sufficient size, in order to permit the relatively small end 199 (FIG. 4) of the handle 35 to pass therethrough. The handle spring 36 biases the handle 35 in the direction away from the bezel 29, in order to drive the handle to the OFF position. In the ON position (FIG. 4), links 65,71 have passed straight alignment (and, thus, have passed the toggle position), and the main spring 63 prevents the handle 35 from opening. The forces of the main spring 63 and the handle spring 36 are predetermined in order that the main spring 63 prevents the handle spring 36 from opening the circuit breaker 1. If the circuit breaker 1 is tripped (FIG. 5), then the main spring 63 drives the movable contact arm 58 to the stop 101, and the force of the main spring is no longer involved in the force balance. Hence, the handle spring 36 can then move the handle 35 to the OFF position. Otherwise, when the circuit breaker 1 is ON and a user pulls on the handle 35, that force is added to the handle spring force until there is sufficient force to overcome the main spring force and open the circuit breaker.

Referring to FIGS. 1 and 6, there are five exemplary electrical connections to the first PCB 41. Additional pins (not shown) electrically interconnect the PCBs 41,43. Two terminals 109,111 pass through openings 112,114 of the insulator 45 and electrically connect mating terminals 113, 115, respectively, of the PCB 41 to a coil assembly 117 of a trip motor or electromagnet assembly 119 (e.g., a solenoid of FIG. 8). Another two terminals 121,123 pass through openings 124,126 of the insulator 45 and electrically connect mating terminals 125,127, respectively, of the PCB 41 across the series combination of a bimetal 129 and the mechanism plate 23, in order to sense current flowing to the load terminal 33. The terminal 121 is electrically connected to the load terminal 33 and to one end (164 as best shown in FIG. 7) of the bimetal 129. The other terminal 123 is electrically connected to the mechanism plate 23, which is electrically connected to the other end (165 as best shown in FIG. 7) of the bimetal 129.

The electronic circuit (FIG. 14) of the PCBs 41,43 employs the voltage between the terminals 125,127. Circuit breaker load current may be determined from the known resistance (e.g., about 5 to 100 milliohms depending on rated current) of the series combination of the bimetal 129 and mechanism plate 23 (i.e., I=V/R). In turn, the electronic circuit determines if an arc fault condition is present and, if so, employs the terminals 113,115, in order to energize the coil assembly 117 and effect an arc fault trip (as discussed below in connection with FIG. 14). A fifth terminal 131 (FIGS. 1–5), which is electrically connected to the bezel 29, passes through opening 132 of the insulator 45 and is electrically connected to mating terminal 133 of the PCB 41, in order to provide a suitable external AC ground reference thereto. The PCBs 41,43 derive power from voltage between the terminals 123,131. Whenever a suitable voltage is present, the PCBs 41,43 illuminate a light emitting diode (LED) 135 (FIG. 1), which is employed in connection with the arc fault indicator 37, as shown near the bottom of the bezel 29 of FIG. 3.

As shown in FIGS. 1 and 6, the terminals 109 and 111 pass through corresponding openings 137 and 139, respectively, of mechanism top plates 24,25, without electrically contacting those plates. The mechanism top plates 24,25 are held in place by three rivet pins 141, 143 and 145 formed on the metal pin 79, the metal pin 61, and a metal pin 147 (as best shown in FIG. 3), which holds the bottom end of the spring 85, respectively. In turn, the rivet pins 141, 143,145 engage the mechanism top plates 24,25 at corresponding openings 149,151,153, respectively, thereof The pin 123, which is electrically connected to the mechanism plate 23, electrically engages the top plates 24,25 at the opening 155. Another opening 157 of the top plates 24,25 pivotally supports a pivot point 159 of the latch assembly 51.

The exemplary top plates 24,25 have a similar, but non-identical shape, with the first top plate 24 being cut away in some areas in order to maintain clearance for certain moving parts of the operating mechanism 22, and the second top plate 25 adding thickness to the first top plate 24 and providing an L-shaped portion 160 for the instantaneous (magnetic) trip function as discussed below in connection with FIGS. 3–6. Preferably, the plates 24,25 are initially formed from the same die.

FIG. 7 shows the load terminal 33, an overcurrent assembly 161 which includes the bimetal 129, the mechanism plate 23, the movable contact arm 58, the separable contacts 59 and the line terminal 32 of the circuit breaker 1 of FIG. 1. The bimetal 129 has two leg portions 162,163 and is fixed and electrically connected at one end or a foot 164 to the load terminal 33. The other bimetal end or a foot 165 engages and is electrically connected to the mechanism plate 23, which, in turn, is electrically connected to the movable contact arm 58 by a pigtail, such as flexible braided conductor 167, which is suitably electrically attached (e.g., by welding) at each end. In this manner, the load current flows from the line terminal 32 to the fixed contact 55, to the movable contact 57, to the movable contact arm 58, to the braided conductor 167, and to the mechanism plate 23, before passing through the bimetal 129 and to the load terminal 33. In the exemplary embodiment, the bimetal 129 is designed for 2.5 A rated load current, although the invention is applicable to a wide range of rated currents (e.g. 15 A or greater). The load current causes $I^2R$ heating of the bimetal 129 resulting in movement of its upper portion (with respect to FIG. 7) to the right side of FIG. 7, with all of the exemplary load current flowing through the bimetal 129. A 15 A bimetal, for example, is U-shaped, and has almost three times the cross section of the exemplary bimetal 129, and can carry more current without fusing.

The exemplary bimetal 129 includes an intermediate U-shaped section 169, which is electrically connected in series between the leg 162 and the foot 164 and the leg 163 and the foot 165. As discussed below in connection with FIG. 8, the bimetal 129 deflects in response to heating caused by certain values of load current flowing through the separable contacts 59 to actuate the latch assembly 51. Hence, the bimetal 129 is responsive to selected conditions (e.g., overload, fault current conditions) of such load current and actuates the operating mechanism 22 through the trip latch 229 (FIG. 8) in order to trip open the separable contacts 59.

The exemplary mechanism plate 23 provides improved support for the bimetal 129 since the foot 165 of the bimetal 129 is attached to the plate 23. This provides improved routing of current through the bimetal 129 from the separable contacts 59, to the movable contact arm 58, to the conductor 167, to the plate 23, and to the bimetal foot 165, which is attached to the plate 23. Furthermore, this provides a simpler routing of the conductor 167 (i.e., from the plate 23 to the movable contact arm 58), rather than from the bimetal foot 165 or leg 163 to the movable contact arm 58).

Figure 8:
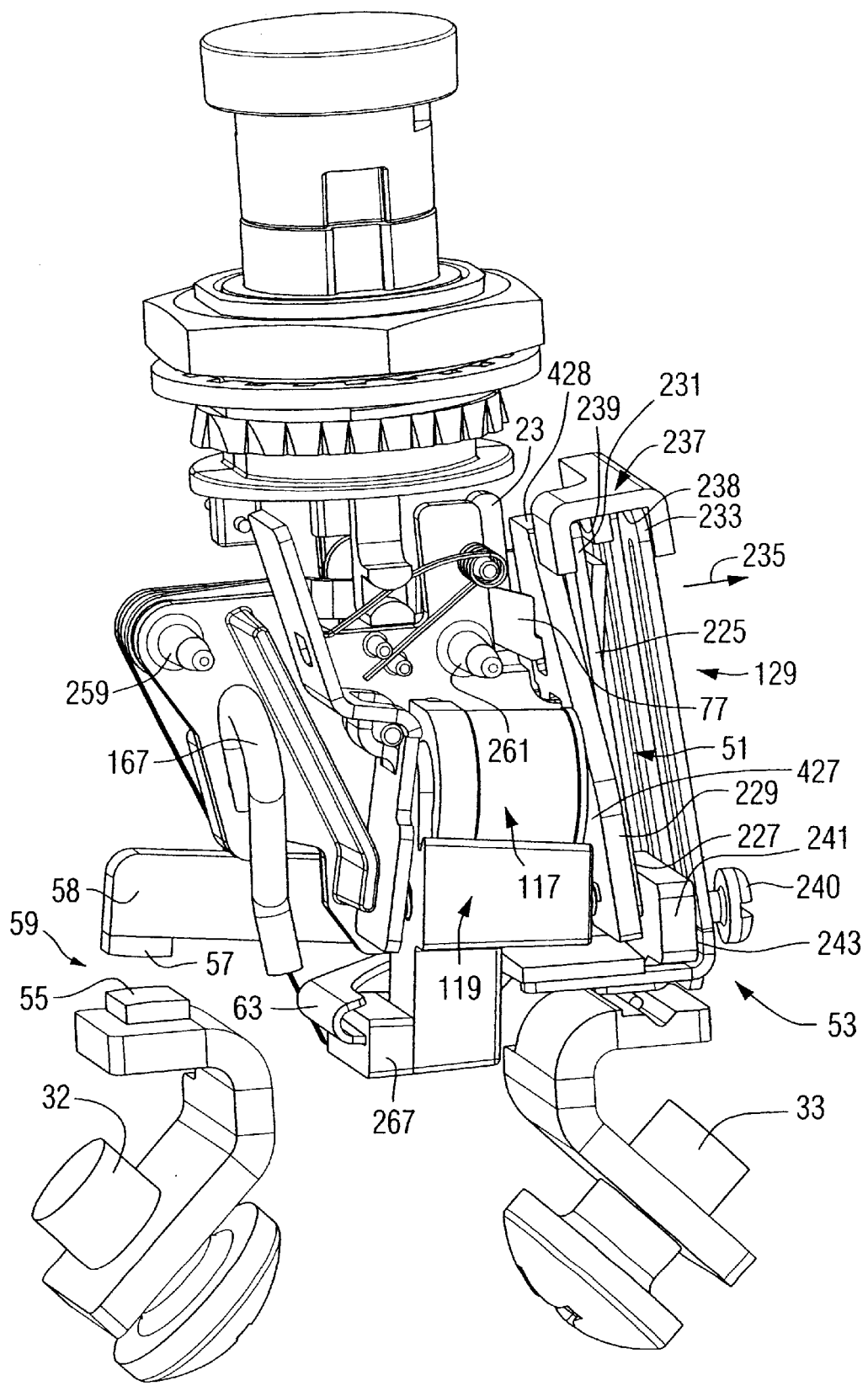
FIG. 8 is an isometric view of the trip motor and bimetal of the circuit breaker of FIG. 1.

FIG. 8 shows the overcurrent assembly 53 including the trip motor or electromagnet assembly 119 and the bimetal 129. A cantilevered ambient compensation bimetal 225 is operatively associated with the bimetal 129. One end 227 of this ambient compensation bimetal 225 is suitably fixed to a trip latch member 229 of the latch assembly 51, such as by spot welding. The cantilevered ambient compensation bimetal 225 extends upward (with respect to FIG. 8) to terminate in a free end 231, which is adjacent to a free end 233 of the bimetal 129. Under normal operating conditions, there is a gap between the free end 233 of the bimetal 129 and the free end 231 of the ambient compensation bimetal 225. When the bimetal 129 is heated, it moves to the right (with respect to FIG. 8) as shown by line 235. An exemplary shuttle 237 made of plastic or some other suitable insulating material has notches 238 and 239, which engage the free ends 233 and 231 of the bimetal 129 and the ambient compensation bimetal 225, respectively. The bimetal 129, when heated, moves the shuttle 237, thus, pulling on the ambient compensation bimetal 225, which, in turn, is coupled to the trip latch 229. An increase or decrease in ambient temperature conditions cause the free end 233 of the bimetal 129 and the free end 231 of the ambient compensation bimetal 225 to move in the same direction and, thereby, maintain the appropriate gap between the two bimetal free ends 231,233, in order to eliminate the effects of changes in ambient temperature. Hence, the bimetal 129 and the cantilevered ambient compensation bimetal 225 are coupled in series to the trip latch 229 to move the same in response to a persistent overcurrent condition as compensated for ambient conditions. Under overcurrent conditions, the bimetal 129, therefore, pulls on the ambient bimetal 225, which rotates the trip latch 229 of the latch assembly 51 clockwise (with respect to FIG. 8, or counter-clockwise with respect to FIG. 6) around the pivot point 159 (FIG. 6) and releases the latch lever 77 to trip the operating mechanism 22.

The thermal trip can be calibrated by a calibration screw 240, which engages the molded case 3a of FIG. 2 and which is threaded into a nut 241 disposed between a lower surface 243 of the bimetal 129 and the fixed end 227 of the ambient compensation bimetal 225. By further threading and tightening the screw 240 into the nut 241, the nut 241 engages the lower bimetal surface 243 and drives the bimetal free end 233 to the right (with respect to FIG. 8) as shown by line 235. Alternatively, reversing the screw 240 out of the nut 241, allows the bimetal free end 233 to return to the left (with respect to FIG. 8).

The exemplary circuit breaker 1 includes three different trip modes, all of which employ the trip latch 229 of FIG. 8 to actuate the operating mechanism 22 and trip open the separable contacts 59: (1) overcurrent conditions (i.e., thermal trip) detected by the bimetal 129 (FIGS. 7 and 8), which actuates the trip latch 229 through the shuttle 237 and ambient compensation bimetal 225; (2) arc fault (and/or ground fault) conditions detected by the PCBs 41,43, which energize the trip motor 119 to actuate the trip latch 229; and (3) relatively high current conditions (i.e., instantaneous trip), which also attract the trip latch 229 (FIGS. 3–6).

As shown in FIG. 8, the mechanism plate 23 has two posts 259,261, which engage corresponding holes 263,265 (FIG. 2) within the cavity 5a of the molded case 3a. Preferably, the posts 259,261 and holes 263,265 provide an alignment function, with the insulator 45, PCBs 41,43 and molded cover 3b, as secured by the clip plate 7, holding the operating mechanism 22, mechanism plate 23 and trip motor 119 within the housing 3 of FIG. 1.

In order to provide an instantaneous trip, the overcurrent assembly 53 of FIGS. 3–5 includes an arrangement for routing a current path of a main conductor, as formed by the bimetal 129, the mechanism plate 23, the flexible braid 167 and the movable contact arm 58, through a magnetic circuit, as formed by the motor frame 267 of FIG. 8 and the two steel mechanism top plates 24,25 of FIG. 6. The motor frame 267 and plates 24,25 form a steel shape around this current path. The discontinuous electrical conduction paths of the exemplary magnetic circuit direct the magnetic flux to flow once through the general path of the steel shape, thereby forming a one-turn electromagnet. Whenever load current flows in the circuit breaker 1, the steel shape magnetically attracts the steel trip latch 229. The magnetic coupling is such that suitably high load currents of at least a predetermined magnitude (e.g., without limitation, about 300 A for a 2.5 A rated load), such as those associated with short circuits, are sufficient to actuate the trip latch 229, without energizing the trip motor coil assembly 117. If the load current is of sufficient magnitude, then the trip latch 229 is rotated in the counter-clockwise direction (with respect to FIG. 5), thereby tripping the circuit breaker 1.

For example, magnetic flux flows around any current carrying conductor and, preferably, flows in steel. Hence, the exemplary steel shape around the exemplary load current path concentrates and channels the magnetic flux to flow through the exemplary steel path. Although the magnetic flux preferably flows in the steel, it also crosses any gaps in such steel. Therefore, the top plates 24,25 are preferably close to the motor frame 267, although physical connection is not required. When the magnetic flux crosses a gap in its path around the discontinuous electrical conduction paths, a force is generated toward closing that gap. Hence, since the steel path encompassing those conduction paths includes gaps between the motor frame 267 and the trip latch 229, and between the L-shaped portion 160 of the top plate 25 and the trip latch 229, forces are generated toward closing those gaps and, thus, actuating the trip latch 229.

Figure 9:
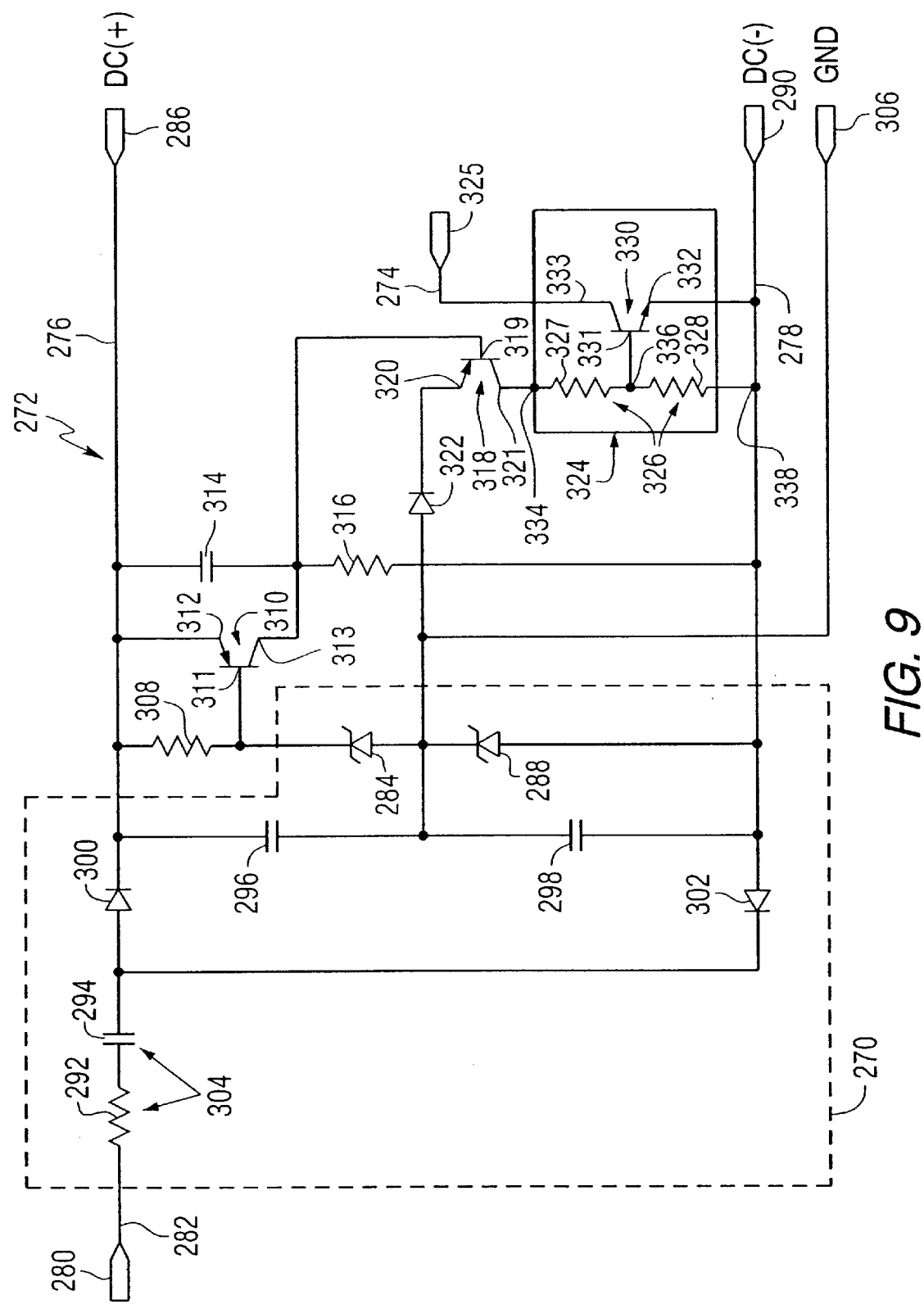
FIG. 9 is a block diagram in schematic form of an AC coupled, dual-DC voltage power supply and lockout circuit for a positive voltage power supply in accordance with an embodiment of the present invention.

FIG. 9 shows an AC coupled, zener diode regulated, dual-DC voltage power supply 270 and monitor circuit 272, which circuit recognizes when positive DC regulation has been lost. The monitor circuit 272 produces a logical output signal 274, which may be employed by downstream circuitry being powered from the positive and negative DC supplies 276,278 to inhibit possible false output indications or even prevent possible damage caused by supply voltage instability.

The exemplary power supply 270 includes an input 280 adapted to receive an AC voltage 282. A regulator, such as the exemplary zener diode 284, is adapted to regulate the first DC voltage DC(+) 276 having a positive polarity at a first output 286. Another regulator, such as the exemplary zener diode 288, is adapted to regulate a second DC voltage DC(−) 278 having a negative polarity at a second output 290. The power supply 270 further includes a resistor 292, capacitors 294,296 and 298, and diodes 300 and 302, which along with the zener diodes 284 and 288, form a conventional AC coupled, zener diode regulated, dual-DC voltage power supply. Although an exemplary power supply 270 is shown, the invention is applicable to a wide range of power supplies having an AC input and dual-DC outputs.

The resistor 292 and the capacitor 294 form a voltage-dropping network 304. The corresponding resistance and capacitance values are suitably sized based upon the expected input AC line voltage and frequency, and the expected output DC load current. The diodes 300 and 302 rectify the current from the voltage-dropping network 304 for the positive DC(+) and negative DC(−) regulated DC supplies 276 and 278, respectively. The diodes 300 and 302 conduct alternatively as the AC voltage from the dropping network 304 supplies a charge current pulse to each DC supply during respective half cycles of the waveform of the AC voltage 282. The rectified current from the diodes 300 and 302 establishes the respective regulated supply voltages DC(+) 276 and DC(−) 278. The capacitor 296 stores charge for the positive DC supply 276, filters noise, and minimizes voltage variation on that positive DC supply between charge cycles. The zener diode 284 regulates the maximum positive DC supply voltage which, for an arc fault detection (AFD) circuit (not shown), is selected to be about +12 to +14 volts with respect to a ground GND node or terminal 306 for the power supply 270 and circuit 272. The ground terminal 306 is adapted for electrical connection to a suitable ground reference. The capacitor 298 and zener diode 288 provide analogous functions to that of the capacitor 296 and zener diode 284 for the negative power supply 278.

A first resistor 308 of the monitor circuit 272 is electrically connected in series with the zener diode 284 of the power supply 270. A first transistor 310 has inputs, a base 311 and an emitter 312, which are electrically connected in parallel with the first resistor 308. The first transistor 310 also has an output or collector 313. A first capacitor 314 is electrically connected between the first output 286 of the power supply 270 and the collector 313 of the first transistor 310. A second resistor 316 is electrically connected in series with the first capacitor 314 between the first and second outputs 286,290 of the power supply 270. A second transistor 318 has a base 319 electrically interconnected with the collector 313 of the first transistor 310, and also has an emitter 320 and a collector 321. A diode 322 is electrically connected between the ground GND terminal 306 and the emitter 320 of the second transistor 318. An interface 324 is employed between the collector 321 of the second transistor 318 and an output terminal 325 for the logical output signal 274 to the input of a trip mechanism (not shown).

The exemplary interface 324 includes a divider 326 formed by series resistors 327,328 and a third transistor 330 having a base 331, an emitter 332 and a collector 333. The divider 326 has a first node 334, which is electrically interconnected with the collector 321 of the second transistor 318, a second node 336, and a third node 338, which is electrically interconnected with the second output 290 of the power supply 270. The third transistor base 331 is electrically interconnected with the second node 336 of the divider 326, the corresponding emitter 332 is electrically interconnected with the second output 290 of the power supply 270, and the corresponding collector 333 is electrically interconnected with the output terminal 325 for the logical output signal 274.

As current is supplied to the positive DC(+) regulated supply 276 and the voltage established on capacitor 296 exceeds the zener voltage of zener diode 284, excess current begins to flow through resistor 308 and establishes a voltage thereacross. Once the voltage across resistor 308 becomes sufficiently high to forward bias the base-emitter junction of transistor 310, such transistor turns-on and the charge accumulated on capacitor 314 is discharged. The series resistor 316 and capacitor 314 comprise an RC pair, which generates a delayed exponential rise in voltage across capacitor 314 over time. If the current charge pulses through diode 300 occur at a sufficient frequency and amplitude, then capacitor 314 remains effectively discharged, thereby indicating that the positive DC supply 276 is in regulation. On the other hand, if insufficient current is supplied through the voltage dropping network 304 from the AC voltage 282, then the voltage on capacitor 314 reaches a sufficiently high level (i.e., providing a negative voltage at the base 319 of the transistor 318), in order to forward bias diode 322 and the base-emitter junction of transistor 318. As a result, current flows through the divider resistors 327,328 and turns transistor 330 on. The collector 333 of transistor 330 may be advantageously employed as open collector logic at the output 325, in order to indicate that the positive DC supply 276 is in regulation (i.e., transistor 310 is on, transistor 318 is off, and transistor 330 is off with its collector 333 being open) or not (i.e., transistor 310 is off, transistor 318 is on, and transistor 330 is on). Similarly, the output 286 may be advantageously employed to indicate the status or "health" of the AC voltage 282 since a sufficient drop in frequency or amplitude causes the corresponding positive DC supply 276 to fall out of regulation.

In the exemplary embodiment, the output 333 of the transistor 330 provides the signal 274, which is responsive to loss of regulation of the positive DC supply 276 for disabling the trip mechanism (not shown). Also, loss of regulation occurs when the frequency of the AC voltage 282 is below a predetermined value (e.g., without limitation, about 250–300 Hz in a 400 Hz system) and/or when the magnitude of the voltage of the AC voltage 282 is below a predetermined value (e.g., without limitation, about 30–35 VAC RMS).

Figure 10:
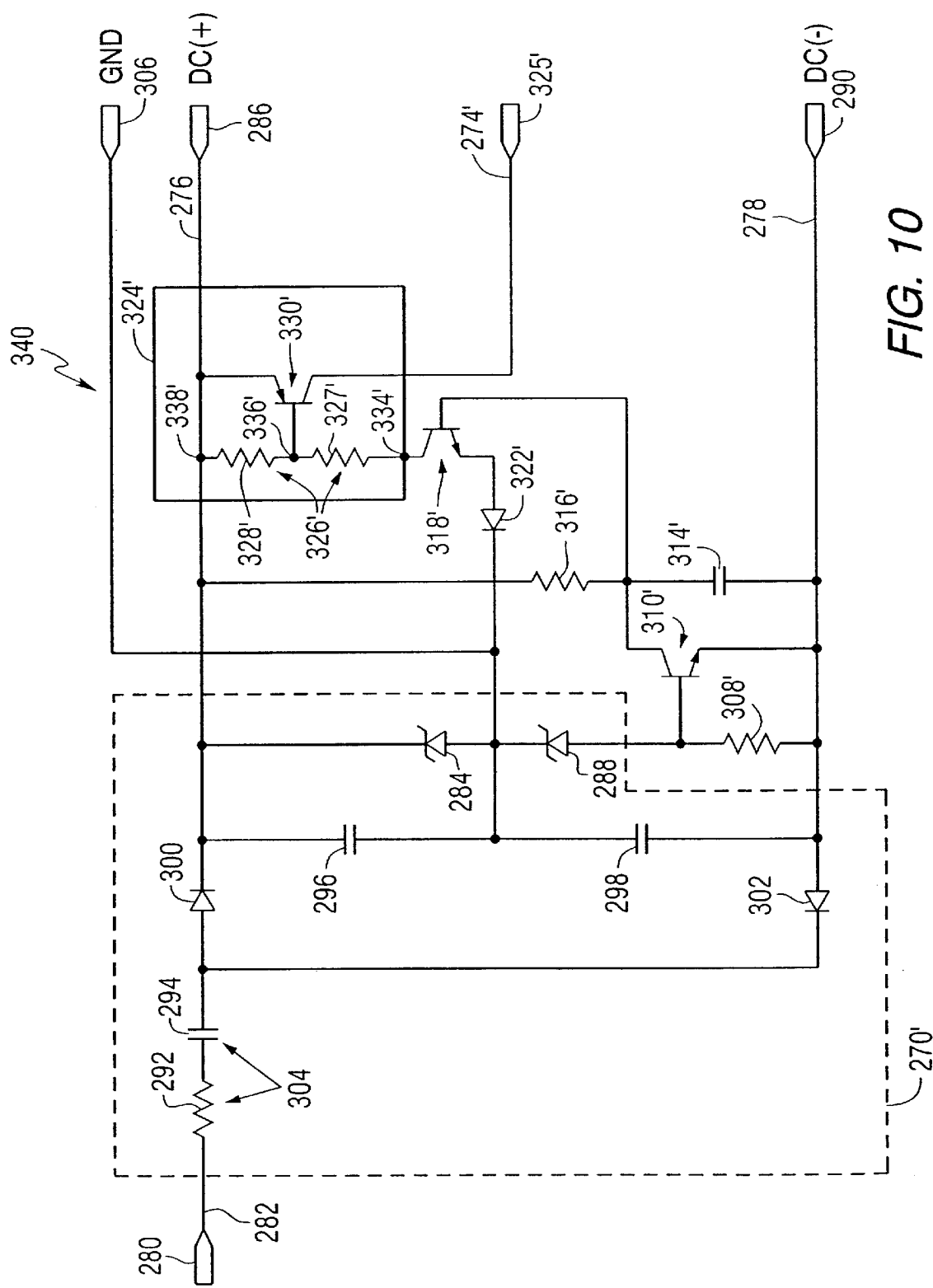
FIG. 10 is a block diagram in schematic form of a power supply and lockout circuit for a negative voltage power supply in accordance with another embodiment of the present invention.

The circuit 272 of FIG. 9 monitors regulation of the positive DC(+) supply 276 only. FIG. 10 shows an analogous circuit 340 for the negative DC(−) supply 278. A first resistor 308' is electrically connected in series with the zener diode 288 of the power supply 270'. A first transistor 310' has a base and an emitter, which are electrically connected in parallel with the first resistor 308'. A first capacitor 314' is electrically connected between the second output 290 of the power supply 270' and the collector of the first transistor 310'. A second resistor 316' is electrically connected in series with the first capacitor 314' between the first and second outputs 286,290 of the power supply 270'. A second transistor 318' has a base electrically interconnected with the collector of the first transistor 310'. A diode 322' is electrically connected between the ground GND terminal 306 and the emitter of the second transistor 318'. An interface 324' is employed between the collector of the second transistor 318' and an output terminal 325' for the logical output signal 274' to the input of a trip mechanism (not shown).

The exemplary interface 324' includes a divider 326' formed by series resistors 327',328', and also includes a third transistor 330'. The divider 326' has a first node 334', which is electrically interconnected with the collector of the second transistor 318', a second node 336', and a third node 338', which is electrically interconnected with the first output 286 of the power supply 270'. The third transistor 330' has a base, which is electrically interconnected with the second node 336' of the divider 326', an emitter, which is electrically interconnected with the first output 286 of the power supply 270', and a collector, which is electrically interconnected with the output terminal 325' for the logical output signal 274'.

The collector of transistor 330' may be advantageously employed as open collector logic at the output 325', in order to indicate that the negative DC supply 278 is in regulation (i.e., transistor 330' is off) or not (i.e., transistor 330' is on). Similarly, the output 290 may be advantageously employed to indicate the status or "health" of the AC voltage 282 since a sufficient drop in frequency or amplitude causes the negative DC supply 278 to fall out of regulation.

Since most applications using dual-DC voltage power supplies do not load each supply equally, implementing one of the above approaches of FIGS. 9 and 10 on the more heavily loaded DC supply may provide adequate indication of total power supply status.

Figure 11:
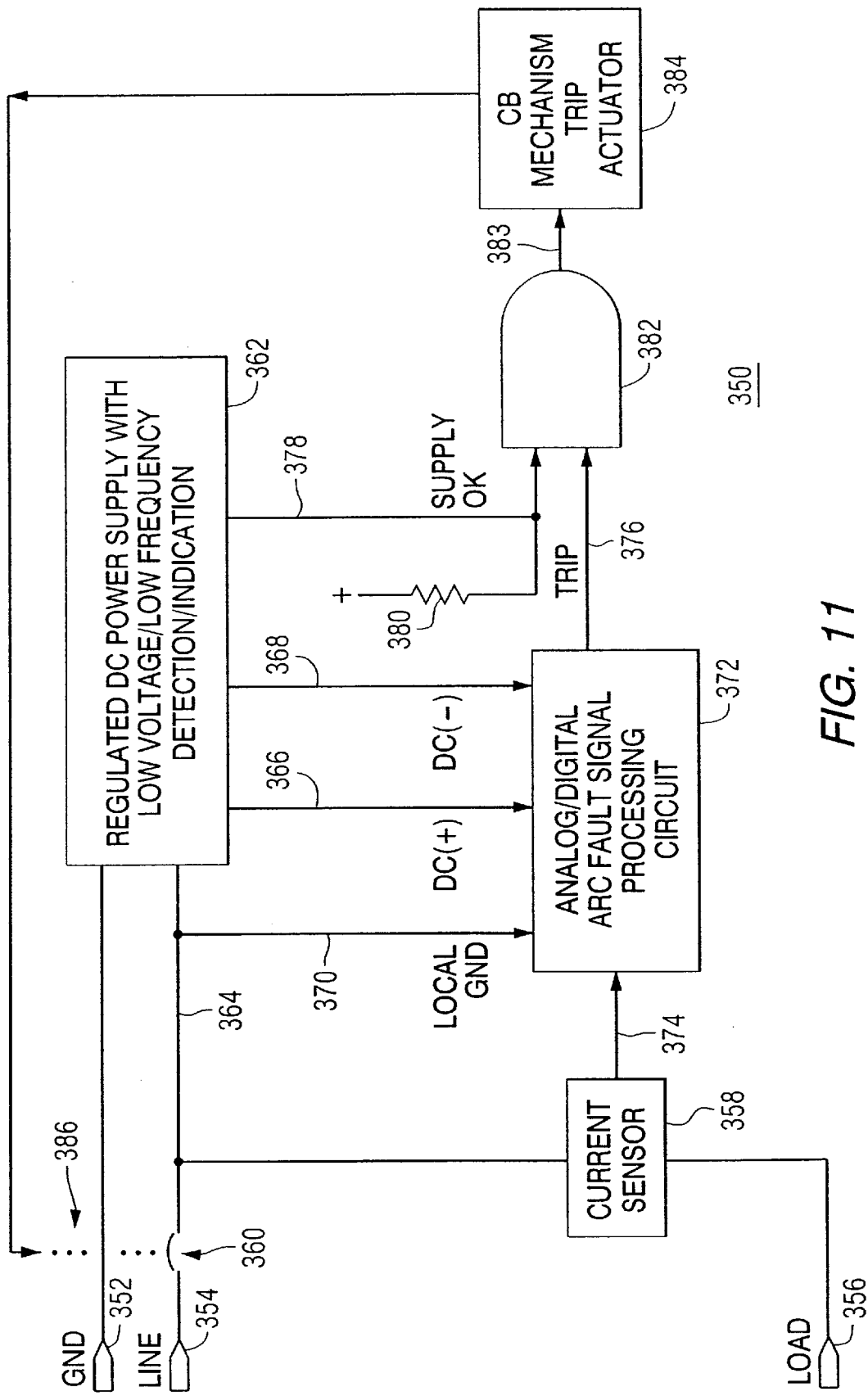
FIG. 11 is a block diagram of a circuit breaker including a low voltage/low frequency lockout circuit and a trip circuit in accordance with an embodiment of the invention.

FIG. 11 shows a circuit breaker 350 including a system AC ground reference 352, a line terminal 354, a load terminal 356 and a suitable current sensor, such as a bimetallic resistive element 358, which is electrically connected in series with separable contacts 360 between the line and load terminals 354,356. A regulated AC/DC power supply 362 employs the AC ground reference 352 and an alternating current voltage 364 from the separable contacts 360 and the line terminal 354, in order to provide suitable DC outputs DC(+) 366 and DC(−) 368 as referenced to a local DC ground 370 (which is not to be confused with the AC ground reference 352). The circuit breaker 350 further includes a suitable trip circuit, such as the exemplary analog/digital arc fault signal processing circuit 372, which employs a voltage 374 from the current sensor 358 and provides a trip signal 376 as a function of that voltage 374. Suitable arc fault detectors, which provide a trip signal from a voltage, are disclosed in incorporated by reference U.S. Pat. Nos. 5,224,006; 5,691,869; and 5,818,237.

The regulated AC/DC power supply 362 includes a suitable low voltage/low frequency detection/indication circuit, such as the monitor circuit 272 of FIG. 9, which circuit recognizes when positive DC regulation has been lost. In turn, a Supply OK signal 378 is output from the monitor circuit, which outputs a high signal through pull-up resistor 380 if the positive DC supply 366 is in regulation. Alternatively, if the positive DC supply 366 is not in regulation, then a low signal is output.

A two-input AND gate 382 receives the signals 376,378 and outputs a power supply qualified trip signal 383 to a circuit breaker mechanism trip actuator 384, such as a solenoid. Whenever the qualified trip signal 383 is active, the actuator 384 releases a latch member 386 to trip the separable contacts 360 open in response to the qualified version (i.e., qualified trip signal 383) of the trip signal 376. Accordingly, through the AND gate 382, the qualified trip signal 383 can only be true if both the (unqualified) trip signal 376 from the exemplary arc fault signal processing circuit 372 is true and the exemplary Supply OK signal 378 is also true.

Figure 12:
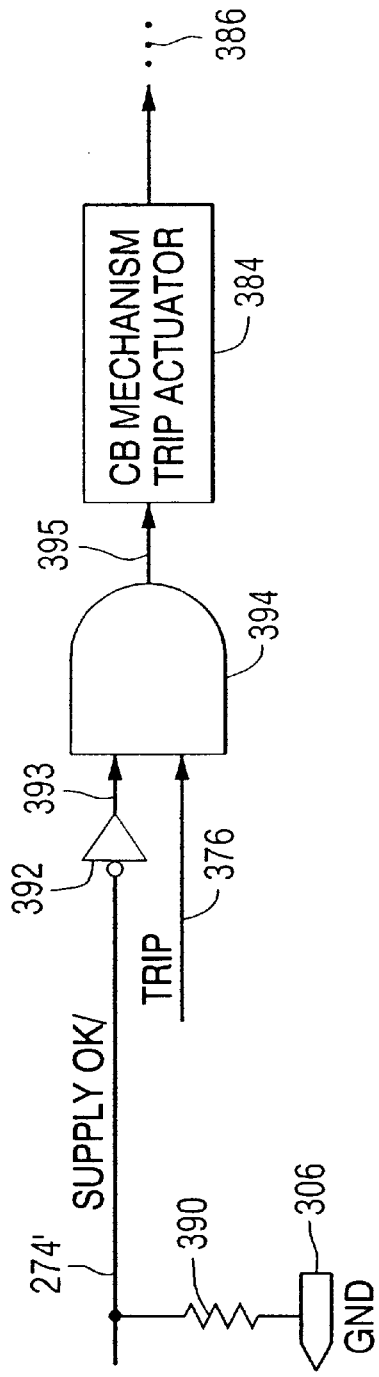
FIGS. 12 and 13 are block diagrams showing logic for lockout and trip circuits in accordance with other embodiments of the invention.

FIG. 12 shows logic for a lockout circuit and trip circuit in accordance with another embodiment of the invention. In this example, a regulated AC/DC power supply, such as 270' of FIG. 10, includes a suitable low voltage/low frequency detection/indication circuit, such as monitor circuit 340 of FIG. 10, which circuit recognizes when negative DC regulation has been lost. In turn, the supply OK/signal 274' is output, which provides a low signal through pull-down resistor 390 if the negative DC supply 278 (FIG. 10) is in regulation. Alternatively, if the negative DC supply 278 is not in regulation, then a high signal is output.

An inverter 392 receives and inverts the signal 274' to provide an inverted signal 393. A two-input AND gate 394 receives the trip signal 376 and the inverted signal 393 and outputs a power supply qualified trip signal 395 to the circuit breaker mechanism trip actuator 384. Whenever the qualified trip signal 395 is active, the actuator 384 releases the latch member 386 to trip separable contacts as discussed above in connection with FIG. 11. Accordingly, through the AND gate 394, the qualified trip signal 395 can only be true if both the (unqualified) trip signal 376 is true and the exemplary DC(−) Supply OK/signal 274' is (low) true.

Figure 13:
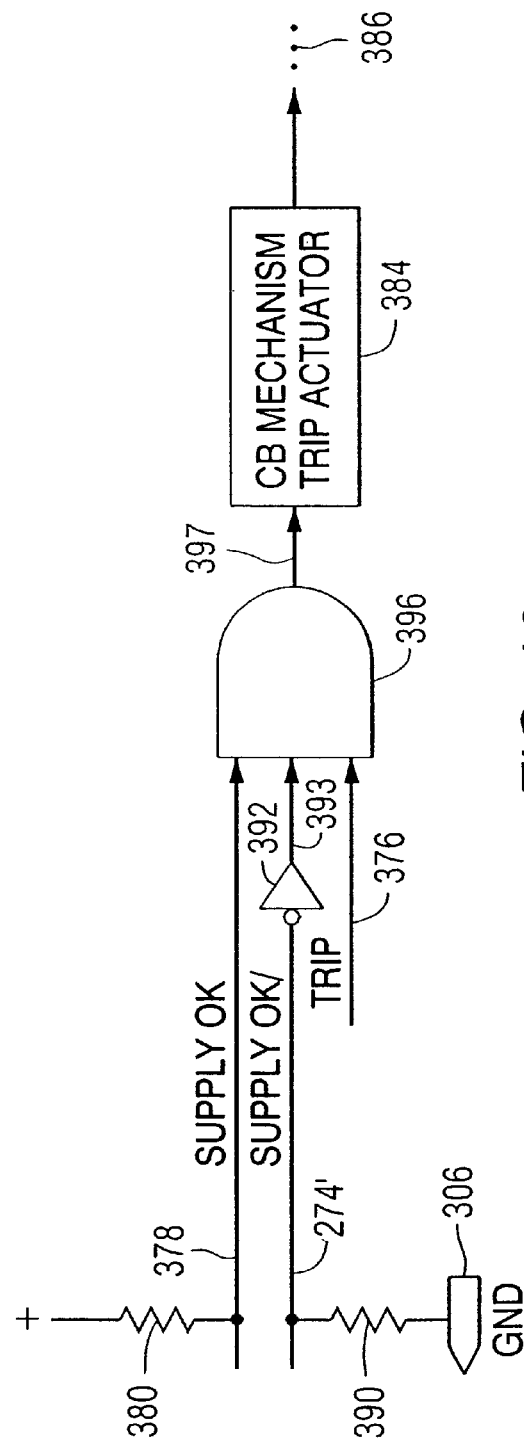

FIG. 13 shows logic for a lockout circuit and trip circuit in accordance with another embodiment of the invention. A three-input AND gate 396 receives the trip signal 376, the inverted signal 393 of FIG. 12, and the signal 378 of FIG. 11 and outputs a power supply qualified trip signal 397 to the circuit breaker mechanism trip actuator 384. Whenever the qualified trip signal 397 is active, the actuator 384 releases the latch member 386 to trip separable contacts as discussed above in connection with FIG. 11. Accordingly, through the AND gate 396, the qualified trip signal 397 can only be true if the (unqualified) trip signal 376 is true, the DC(−) Supply OK/signal 274' is (low) true, and the DC(+) Supply OK signal 378 is (high) true.

Figure 14:
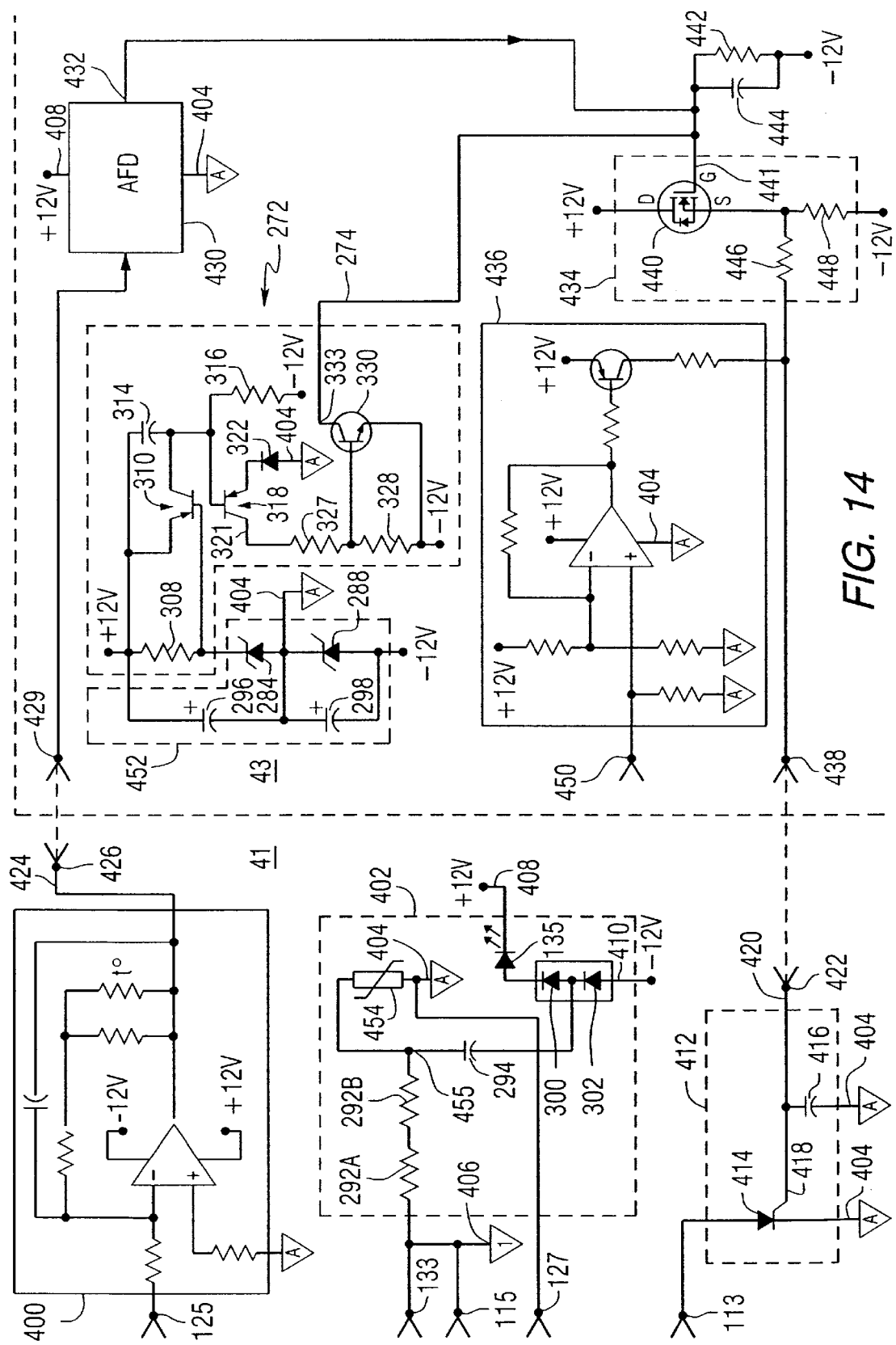
FIG. 14 is a block diagram in schematic form showing a low voltage/low frequency lockout circuit and trip circuit of the two printed circuit boards of the circuit breaker of FIG. 1.

Referring to FIG. 14, the first PCB 41 of the circuit breaker 1 of FIG. 1 includes the terminals 113,115,125,127, 133. The first PCB 41 further includes a compensation circuit 400 and a first portion 402 of an AC/DC power supply, which is referenced to the terminal 127 (i.e., the mechanism plate terminal 123 of FIG. 6). The AC/DC power supply portion 402 inputs an AC voltage, which is defined by the AC voltage between the terminal 127 (i.e., local reference 404) and the terminal 115 (i.e., AC reference 406). The local reference 404, which is the line voltage on the mechanism plate 23 (FIG. 6) when the separable contacts 59 are closed with the line terminal 32 being energized, is not to be confused with the AC reference 406, which is the system ground from the terminal 131 and the bezel 29 of FIG. 3. The exemplary power supply portion 402 (along with a second power supply portion 452 of the second PCB 43) outputs a +12 VDC voltage 408 and a −12 VDC voltage 410 for use by the PCBs 41,43.

The first PCB 41 also includes a trip actuator drive circuit 412 including a silicon-controlled rectifier (SCR) 414 and a gate capacitor 416 disposed between the SCR gate 418 and the local reference 404. The SCR gate 418 is driven by a trip signal 420 on a terminal 422 from the second PCB 43. When the trip signal 420 transitions to an active state, the SCR 414 is turned on, thereby providing the AC voltage (i.e., between the terminals 113 and 115) to energize the coil assembly 117 of the trip motor 119 of FIG. 8.

The compensation circuit 400, which is not part of the present invention, inputs the bimetal voltage from the terminal 125, which is electrically connected to the load terminal 33, and outputs a compensated voltage 424 on a terminal 426 to the second PCB 43. The first terminal (i.e., the foot 165) of the bimetal 129 has a first voltage, which is the AC voltage of the mechanism plate 23 with respect to the system ground of the bezel 29, and the second terminal (i.e., the foot 164) of the bimetal 129 has a second voltage, which is the AC voltage of the load terminal 33. Those AC voltages differ (i.e., )V=IR) as a function of the resistance (R) of the bimetal 129 and the load current (I).

The energized coil assembly 117 of FIG. 8 drives an armature section 427 of the trip latch 229 to release the latch member 77. When the coil assembly 117 is energized, the trip latch armature section 427 is attracted toward the core of the trip motor 119, thereby rotating the upper portion 428 right (with respect to FIG. 8) to an unlatched position.

Referring again to FIG. 14, the second PCB 43 includes an input terminal 429 from the terminal 426 of the first PCB 41, a suitable arc fault detection (AFD) circuit 430 having an output 432, a gate drive circuit 434, a trip actuator drive circuit 436, and an output terminal 438 to the terminal 422 of the first PCB 41. The gate drive circuit 434 has a MOSFET transistor 440, the gate 441 of which is normally biased off by the negative voltage from the resistor 442. Whenever the output 432 of the AFD circuit 430 provides a sufficient time attenuated arc fault accumulation on the capacitor 444, the gate 441 of the transistor 440 is active and the transistor 440 provides the active trip signal 420 through the resistor 446, terminals 438,422 to the gate 418 of the SCR 414, which, in turn, energizes the coil assembly 117. Otherwise, the SCR gate 418 is biased off by the negative voltage from the resistor 448. An additional trip function is provided by the trip actuator drive circuit 436 whenever the input terminal 450 is tied to a suitable positive voltage, such as +12 VDC 408. For example, two negative temperature coefficient thermistors (not shown) are mounted at the circuit breaker terminals 32,33 (FIG. 5) and initiate a trip if the terminals overheat. Those thermistors are electrically connected in parallel between the +12 VDC voltage 408 and the input terminal 450. As the terminal temperature rises, the thermistor resistance decreases and the voltage at terminal 450 approaches the trip threshold of the circuit 436, which ultimately trips the circuit breaker 1.

The second PCB 43 further includes a second portion 452 of the AC/DC power supply. The first and second portions 402,452 form the AC/DC power supply, which is substantially the same as the power supply 270 of FIG. 9. The only differences include the two series resistors 292A and 292B in place of the single resistor 292 of FIG. 9, the addition of the MOV 454, which limits the AC voltage between the node 455 and the local reference 404, and the addition of the LED 135, which is illuminated by the load current of the +12 VDC voltage 408. Otherwise, the components of the first and second portions 402,452 are numbered in the same manner as the corresponding components of the power supply 270 of FIG. 9.

The second PCB 43 also includes the monitor circuit 272 of FIG. 9, in which the collector 333 of the transistor 330 is advantageously electrically connected to the gate 441 of the MOSFET 440. As discussed above, the breaker trip actuator is a solenoid coil assembly 117, which is driven by the SCR 414. The SCR gate 418 is triggered by the MOSFET 440 when sufficient charge is accumulated on capacitor 444 as a result of detected arcing activity by the AFD circuit 430. If, however, the +12 VDC voltage 408 is not in regulation, then transistor 330 is on, thereby keeping the capacitor 444 discharged (i.e., by clamping the gate 441 to −12 VDC and the MOSFET 440 off), thus, inhibiting the downstream SCR 414 from being triggered on. In this manner, the AFD output 432 is disabled, thereby also disabling the trip signal 420, which is, thus, qualified by the monitor circuit 272.

Although regulated negative voltage power supplies 278, 368,410 have been disclosed, the emitter of transistor 330 and the base of transistor 318 may be referenced to suitable non-regulated negative voltages, such that diode 322 and transistors 318,330 are biased on.

Although exemplary PNP bipolar transistors 310,318 and NPN bipolar transistors 310',318' are disclosed, other suitable transistors (e.g., MOSFETs) may be employed.

Although an exemplary AFD circuit 430 employing the +12 VDC voltage 408 is disclosed, alternative circuit breaker circuits providing functions for ground fault, instantaneous trip, thermal trip or any other known circuit breaker trip function may be employed. The exemplary monitor circuit 272 may, thus, be employed to inhibit operation of any suitable downstream device (e.g., without limitation, an electronic security system) that could behave erratically as a result of an unstable power supply situation.

Although an exemplary interface circuit 324 is disclosed, any suitable interface between the exemplary transistor 318 (or its equivalent) and the downstream device, such as the exemplary AFD circuit 430, may be employed to disable its operation. For example, an active high signal, which is referenced to a negative supply, may be employed to provide a suitable disable signal. Hence, the exemplary interface 324 is not required and the collector 321 of transistor 318 may provide a suitable disable signal.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A circuit breaker comprising:
   separable contacts;
   an operating mechanism for opening and closing said separable contacts;
   a power supply comprising an input adapted to receive an alternating current voltage, a regulator adapted to regulate a first direct current voltage having a first polarity, a first output adapted to provide the first direct current voltage, and a second output adapted to provide a second direct current voltage having a second polarity which is opposite the first polarity;
   a trip mechanism cooperating with said operating mechanism, powered from the first output of said power supply, and responsive to electrical conditions of said separable contacts for tripping said separable contacts open, said trip mechanism having an input for disabling said tripping; and
   a power supply monitor circuit comprising:
      a node adapted for electrical connection to a ground,
      a first resistor electrically connected in series with the regulator of said power supply,
      a first transistor having two inputs electrically connected in parallel with said first resistor and having an output,
      a first capacitor electrically connected between the first output of said power supply and the output of said first transistor,
      a second resistor electrically connected in series with the first capacitor between the first and second outputs of said power supply,
      a second transistor having a first input electrically interconnected with the output of said first transistor, a second input and an output,
      a diode electrically connected between the node and the second input of the second transistor, and
      an interface between the output of the second transistor and the input of said trip mechanism.

2. The circuit breaker of claim 1 wherein said interface includes a divider having a first node electrically interconnected with the output of the second transistor, a second node, and a third node electrically interconnected with the second output of said power supply; and a third transistor having a first input electrically interconnected with the second node of said divider, a second input electrically interconnected with the second output of said power supply, and an output electrically interconnected with the input of said trip mechanism, said output of said third transistor providing a signal responsive to loss of regulation of the first output of said power supply for disabling said trip mechanism.

3. The circuit breaker of claim 1 wherein said interface includes a transistor having a collector, which is open when the first output of said power supply is in regulation; and wherein said trip mechanism includes an arc fault detector powered from the first output of said power supply, said arc fault detector having a capacitor, which is electrically connected to said collector, said capacitor being discharged by said collector when said power supply is out of regulation in order to disable said arc fault detector.

4. The circuit breaker of claim 1 wherein the first transistor of said power supply monitor circuit is on, and the second transistor of said power supply monitor circuit is off when the first output of said power supply is in regulation.

5. The circuit breaker of claim 1 wherein the first transistor of said power supply monitor circuit is off, and the second transistor of said power supply monitor circuit is on when the first output of said power supply is out of regulation.

6. The circuit breaker of claim 1 wherein the alternating current voltage has a frequency; and wherein the first transistor of said power supply monitor circuit is off, and the second transistor of said power supply monitor circuit is on when said frequency is below a predetermined value.

7. The circuit breaker of claim 1 wherein the alternating current voltage has a magnitude; and wherein the first transistor of said power supply monitor circuit is off, and the second transistor of said power supply monitor circuit is on when said magnitude is below a predetermined value.

8. The circuit breaker of claim 1 wherein the first output of said power supply is adapted to provide a positive voltage as said first direct current voltage.

9. The circuit breaker of claim 8 wherein said power supply monitor circuit is adapted to monitor regulation of said positive voltage.

10. The circuit breaker of claim 1 wherein the first output of said power supply is adapted to provide a negative voltage as said first direct current voltage.

11. The circuit breaker of claim 10 wherein said power supply monitor circuit is adapted to monitor regulation of said negative voltage.

12. The circuit breaker of claim 1 wherein the first output of said power supply is adapted to provide a positive voltage as said first direct current voltage, and the second output of said power supply is adapted to provide a negative voltage as said second direct current voltage.

13. The circuit breaker of claim 12 wherein said power supply monitor circuit is adapted to monitor regulation of at least one of said positive voltage and said negative voltage.

14. The circuit breaker of claim 12 wherein said power supply monitor circuit is adapted to monitor regulation of both of said positive voltage and said negative voltage.

15. The circuit breaker of claim 12 wherein said power supply monitor circuit is adapted to monitor regulation of only one of said positive voltage and said negative voltage.

16. The circuit breaker of claim 12 wherein one of said positive voltage and said negative voltage of said power supply is adapted to power a first load and the other of said positive voltage and said negative voltage of said power supply is adapted to power a second load, which is less than said first load.

17. The circuit breaker of claim 1 wherein said power supply further comprises:

a resistor, a first capacitor electrically connected in series with said resistor of said power supply, the series combination of said resistor of said power supply and said first capacitor of said power supply having a first node electrically connected to the input of said power supply and a second node, a diode electrically connected between the first output of said power supply and the second node of the series combination of said resistor of said power supply and said first capacitor of said power supply, and a second capacitor electrically connected between the first output of said power supply and the node; and wherein said regulator of said power supply is a zener diode electrically interconnected between the first output of said power supply and the node.

18. The circuit breaker of claim 17 wherein said diode of said power supply has an anode and a cathode, with the cathode being electrically connected to the first output of said power supply and with the anode being electrically connected to the second node of the series combination of said resistor of said power supply and said first capacitor of said power supply; and wherein the first output of said power supply is adapted to provide a positive voltage as said first direct current voltage.

19. The circuit breaker of claim 18 wherein said power supply further comprises means for providing a negative voltage.

20. The circuit breaker of claim 17 wherein said diode of said power supply has an anode and a cathode, with the anode being electrically connected to the first output of said power supply and with the cathode being electrically connected to the second node of the series combination of said resistor of said power supply and said first capacitor of said power supply; and wherein the first output of said power supply is adapted to provide a negative voltage as said first direct current voltage.

21. The circuit breaker of claim 20 wherein said power supply further comprises means for providing a positive voltage.

\* \* \* \* \*